(12) United States Patent
Askan

(10) Patent No.: US 11,367,578 B2
(45) Date of Patent: Jun. 21, 2022

(54) CIRCUIT BREAKER

(71) Applicant: Eaton Intelligent Power Limited, Dublin (IE)

(72) Inventor: Kenan Askan, Vienna (AT)

(73) Assignee: Eaton Intelligent Power Limited, Dublin (IE)

( * ) Notice: Subject to any disclaimer, the term of this patent is extended or adjusted under 35 U.S.C. 154(b) by 454 days.

(21) Appl. No.: 16/331,535

(22) PCT Filed: Sep. 8, 2017

(86) PCT No.: PCT/EP2017/072668
§ 371 (c)(1),
(2) Date: Mar. 8, 2019

(87) PCT Pub. No.: WO2018/046708
PCT Pub. Date: Mar. 15, 2018

(65) Prior Publication Data
US 2019/0206638 A1 Jul. 4, 2019

(30) Foreign Application Priority Data
Sep. 9, 2016 (DE) ...................... 10 2016 117 005.4

(51) Int. Cl.
*H01H 9/54* (2006.01)
*H02H 3/02* (2006.01)
(Continued)

(52) U.S. Cl.
CPC ............ *H01H 9/542* (2013.01); *H01H 9/548* (2013.01); *H01H 9/563* (2013.01); *H02H 3/023* (2013.01);
(Continued)

(58) Field of Classification Search
CPC .. H01H 9/542; H01H 9/548; H01H 2009/544; H01H 9/563; H01H 3/023;
(Continued)

(56) References Cited

U.S. PATENT DOCUMENTS 3,558,910 A 1/1971 Dale et al.
9,142,956 B2 9/2015 Yatsu
(Continued)

FOREIGN PATENT DOCUMENTS

CN 202696106 U 1/2013
CN 103378758 A 10/2013
(Continued)

*Primary Examiner* — Kevin J Comber
(74) *Attorney, Agent, or Firm* — Leydig, Voit & Mayer, Ltd.

(57) ABSTRACT

A circuit breaker includes: at least one external conductor section from an external conductor supply terminal of the circuit breaker to an external conductor load terminal of the circuit breaker; and one neutral conductor section from a neutral conductor terminal of the circuit breaker to a neutral conductor load terminal of the circuit breaker. A mechanical bypass switch is arranged in the at least one external conductor section. A semiconductor circuit arrangement of the circuit breaker, which semiconductor circuit arrangement comprises a four-quadrant switch, is connected in parallel with the bypass switch. A current measuring arrangement is arranged in the at least one external conductor section and is connected to an electronic control unit of the circuit breaker. The electronic control unit is configured to operate the bypass switch and the semiconductor circuit arrangement in a prespecifiable manner. A voltage-dependent resistor is arranged in parallel with the bypass switch.

14 Claims, 2 Drawing Sheets

(51) Int. Cl.
*H02H 3/08* (2006.01)
*H01H 9/56* (2006.01)

(52) U.S. Cl.
CPC ............. *H02H 3/08* (2013.01); *H01H 9/56* (2013.01); *H01H 2009/543* (2013.01); *H01H 2009/544* (2013.01)

(58) Field of Classification Search
CPC ...... H01H 3/08; H01H 9/56; H01H 2009/543; H02H 3/023; H02H 3/08
USPC .......................................................... 361/13
See application file for complete search history.

(56) References Cited

U.S. PATENT DOCUMENTS

| | | |
|---|---|---|
| 2008/0143462 A1 | 6/2008 | Belisle et al. |
| 2015/0371799 A1 | 12/2015 | Sumino et al. |
| 2016/0203932 A1 | 7/2016 | Niehoff |
| 2016/0314928 A1* | 10/2016 | Niehoff ................. H01H 83/04 |
| 2019/0206640 A1* | 7/2019 | Askan ...................... H02H 3/08 |
| 2019/0252143 A1* | 8/2019 | Askan .................... H02H 7/222 |
| 2019/0279829 A1* | 9/2019 | Askan ...................... H02H 3/08 |
| 2020/0194195 A1* | 6/2020 | Askan ................... H01H 9/542 |

FOREIGN PATENT DOCUMENTS

| | | |
|---|---|---|
| CN | 105609344 A | 5/2016 |
| EP | 2149988 A2 | 2/2010 |
| WO | 2015028634 A1 | 3/2015 |

\* cited by examiner

CIRCUIT BREAKER

CROSS-REFERENCE TO PRIOR APPLICATIONS

This application is a U.S. National Phase application under 35 U.S.C. § 371 of International Application No. PCT/EP2017/072668, filed on Sep. 8, 2017, and claims benefit to German Patent Application No. DE 10 2016 117 005.4, filed on Sep. 9, 2016. The International Application was published in German on Mar. 15, 2018 as WO 2018/046708 under PCT Article 21(2).

FIELD

The invention relates to a circuit breaker.

BACKGROUND

A corresponding circuit breaker is known in the art from WO 2015/028634 A1 assigned to Applicant. Such a so-called hybrid circuit breaker comprises a semiconductor circuit arrangement, which includes a rectifier in a Graetz configuration and one, two, or more IGBTs. Furthermore, the respective circuitry comprises a snubber. Disadvantageous, in this configuration, is the large number of required components, which will lead to high power losses, beside the sheer expense of the components. High power losses will lead to high intrinsic heating of the circuit breaker and to a reduction of the lifetime of the semiconductor components.

Due to the numerous components connected in series, the semiconductor circuit arrangement further has a high loop inductance, whereby the time is increased, within which, when turning the circuit breaker off, the current will commute onto the semiconductor circuit arrangement. Thereby, the switching contacts of the bypass switch are heavily loaded by the long-standing switching arc.

Moreover, the high number of bipolar components will lead to high transients during switching operations.

SUMMARY

In an embodiment, the present invention provides a circuit breaker, comprising: at least one external conductor section from an external conductor supply terminal of the circuit breaker to an external conductor load terminal of the circuit breaker; and one neutral conductor section from a neutral conductor terminal of the circuit breaker to a neutral conductor load terminal of the circuit breaker, wherein a mechanical bypass switch is arranged in the at least one external conductor section, wherein a semiconductor circuit arrangement of the circuit breaker, which semiconductor circuit arrangement comprises a four-quadrant switch, is connected in parallel with the bypass switch, wherein a current measuring arrangement is arranged in the at least one external conductor section and is connected to an electronic control unit of the circuit breaker, wherein the electronic control unit is configured to operate the bypass switch and the semiconductor circuit arrangement in a prespecifiable manner, wherein a voltage-dependent resistor is arranged in parallel with the bypass switch, and wherein the semiconductor circuit arrangement has two discrete semiconductor components.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

In an embodiment, the present invention provides a circuit breaker of the type referred to above, by means of which the mentioned disadvantages can be avoided, which has a lower number of components and a longer lifetime, and which can be manufactured at low cost.

Thereby, a circuit breaker can be obtained, which comprises a low number of components and enables a simple manufacture. Thereby, the cost of components for making a hybrid circuit breaker can be considerably reduced. Thereby, further, the quality of manufacture can be improved, and the failure rate can be reduced.

Thereby, the power loss within the circuit breaker can be significantly lowered, whereby intrinsic heating is reduced, and the lifetime of the circuit breaker can be increased.

Thereby, the loop resistance as well as the loop inductance can be lowered, whereby, when turning off, the time for the commutation of the current from the bypass switch to the semiconductor circuit arrangement can be shortened, whereby the loading of the bypass switch as well as of the semiconductor circuit arrangement can be lowered, and consequently the lifetime of the circuit breaker can be increased. By the considerable reduction of the number of components of the first semiconductor circuit arrangement, in particular the inductivity can be significantly lowered.

Thereby, transients during switching operations can be suppressed.

Figure 2:
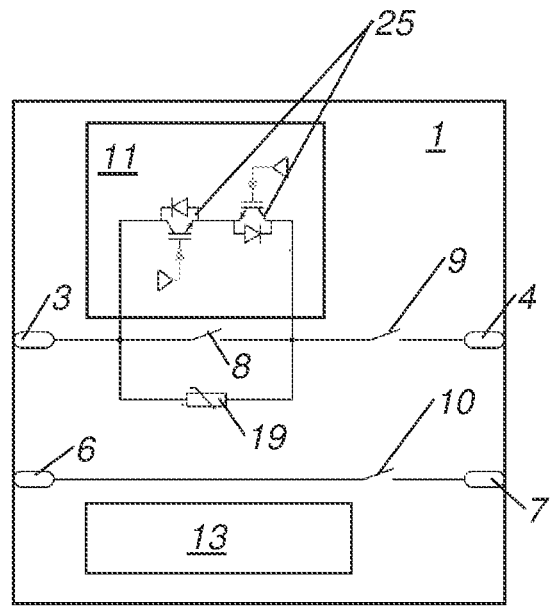
FIG. 2 a first embodiment of a present circuit breaker.
Figure 3:
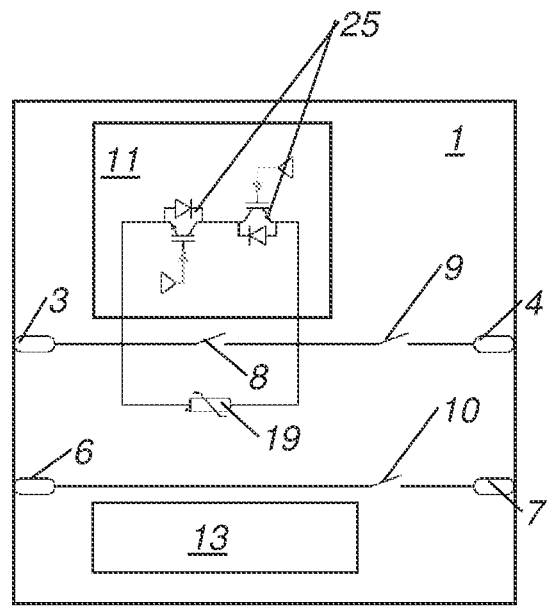
FIG. 3 a second embodiment of a present circuit breaker.
Figure 4:
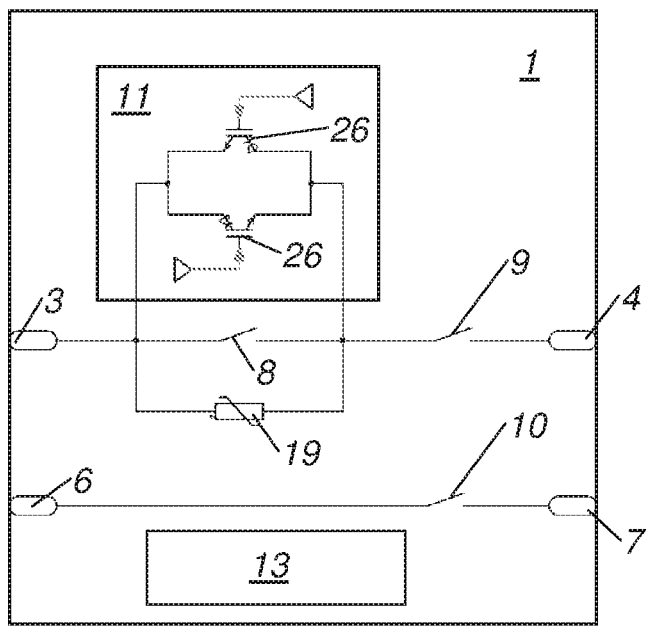
FIG. 4 a third embodiment of a present circuit breaker.

FIGS. 2 to 4 show preferred embodiments of a circuit breaker 1 having an external conductor section 2 from an external conductor supply terminal 3 of the circuit breaker 1 to an external conductor load terminal 4 of the circuit breaker 1, and a neutral conductor section 5 from a neutral conductor terminal 6 of the circuit breaker 1 to a neutral conductor load terminal 7 of the circuit breaker 1, wherein a mechanical bypass switch 8 is arranged in the external conductor section 2, wherein a semiconductor circuit arrangement 11 of the circuit breaker 1, which semiconductor circuit arrangement is in the form of a four-quadrant switch, is connected in parallel with the bypass switch 8, wherein a current measuring arrangement 12 is arranged in the external conductor section 2 and is connected to an electronic control unit 13 of the circuit breaker 1, wherein the electronic control unit 13 is designed to operate the bypass switch 8 and the semiconductor circuit arrangement 11 in a prespecifiable manner, and wherein a voltage-dependent resistor 19, in particular a varistor, is arranged in parallel with the bypass switch 8, wherein the semiconductor circuit arrangement 11 includes, preferably only, two discrete semiconductor components.

Thereby, a circuit breaker 1 can be obtained, which comprises a low number of components and enables a simple manufacture. Thereby, the cost of components for the manufacture of a hybrid circuit breaker 1 can be considerably reduced. Thereby, further, the quality of manufacture can be improved, and the failure rate can be reduced.

Thereby, the power loss within the circuit breaker 1 can be significantly lowered, whereby intrinsic heating is reduced, and the lifetime of the circuit breaker 1 can be increased.

Thereby, the loop resistance as well as the loop inductance can be lowered, whereby, when turning off, the time for the commutation of the current from the bypass switch to the semiconductor circuit arrangement 11 can be shortened, whereby the load of the bypass switch as well as of the semiconductor circuit arrangement 11 can be lowered, and consequently the lifetime of the circuit breaker 1 can be increased. By the considerable reduction of the number of components of the first semiconductor circuit arrangement 11, in particular the inductivity can be significantly lowered.

Thereby, transients during switching operations can be suppressed.

Figure 1:
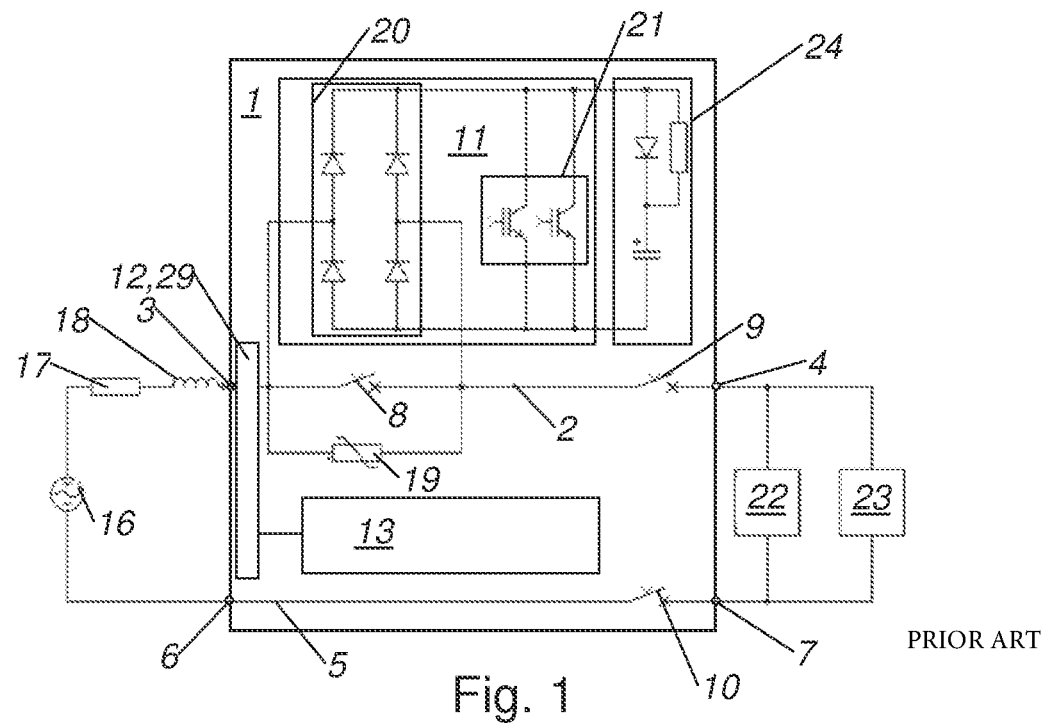
FIG. 1 an embodiment of a circuit breaker according to prior art.

The circuit breakers 1 of FIGS. 2 to 4 may correspond, except for the design of the semiconductor circuit arrangement 11, to the circuit breaker 1 of FIG. 1.

The circuit breaker 1 of FIG. 1 comprises at least one external conductor section 2 and one neutral conductor section 5. The external conductor section 2 extends through the circuit breaker 1 from an external conductor supply terminal 3 to an external conductor load terminal 4. The neutral conductor section 5 extends through the circuit breaker 1 from a neutral conductor terminal 6 to a neutral conductor load terminal 7. The respective terminals 3, 4, 6, 7 are preferably screw terminals or plug-in terminals, and are accessible from outside of the circuit breaker 1.

The present circuit breaker 1 preferably is a low-voltage circuit breaker. Low voltage usually means up to 1,000 volts AC voltage or 1,500 volts DC voltage.

The circuit breaker 1 preferably comprises a housing of insulating material.

A mechanical bypass switch 8 is arranged in the external conductor section 2. Preferably and as shown, further, a first mechanical disconnector switch 9 is arranged in the external conductor section 2, in particular in series with the bypass switch 8. Preferably, a second mechanical disconnector switch 10 is arranged in the neutral conductor section 5. A semiconductor circuit arrangement 11 is connected in parallel with the bypass switch 8.

Furthermore, a voltage-dependent resistor 19 is connected in parallel with the bypass switch 8, which resistor is in particular designed in the form of a metal-oxide varistor.

The circuit breaker 1 further comprises a current measuring arrangement 12, which is arranged in the external conductor section 2, and which preferably comprises a shunt resistor. The current measuring arrangement 12 is not shown in FIGS. 2 to 4.

The current measuring arrangement 12 is connected to an electronic control unit 13 of the circuit breaker 1, which preferably comprises a micro-controller or a micro-processor. The electronic control unit 13 is designed to control the bypass switch 8 and the semiconductor circuit arrangement 11, and preferably the first mechanical disconnector switch 9 and the second mechanical disconnector switch 10, so to operate or switch them in a prespecifiable manner. For this purpose, the electronic control unit 13 is connected, preferably by a circuitry, to the first semiconductor circuit arrangement 11, and further to, in particular, electromagnetic actuating elements of the mechanical switches, thus of the bypass switch 8, of the first mechanical disconnector switch 9 and of the second mechanical disconnector switch 10. The respective connections, extending from the electronic control unit 13, are not shown in FIGS. 1 to 4.

The semiconductor circuit arrangement 11 comprises, as per prior art shown in FIG. 1, a rectifier circuit 20, which preferably is configured in the form of a full bridge, and two IGBTs 21 as the actual switching or controlling elements.

In FIG. 1, in addition to the circuit breaker 1, the electric environment thereof is further indicated. The power mains are illustrated by the AC/DC mains voltage source 16, the power mains internal resistance 17 and the power mains inductivity 18. Furthermore, an electric load 23, and an electric fault 22 in the form of a short-circuit are shown.

In a circuit breaker 1 of FIG. 1, it is provided that a turning-off operation of the bypass switch 8 and of the first semiconductor circuit arrangement 11 is performed, and the first and second disconnector switches 9, 10 only serve for securing a galvanic separation of the load circuit after turning-off.

It is provided, for the pre-determined, in particular manually controlled, turning-on or off operation of the circuit breaker 1, in particular during operation of the circuit breaker 1 within the rated current range, that the bypass switch 8 is turned off or opened when the current crosses zero. If the load is reactive, i.e. inductive or capacitive, the voltage, at zero-crossing of the current and consequently at turning-off, will not be zero. The value of the voltage is dependent, as is known, on the respective cos φ. It is provided, after opening of the bypass switch 8 and the subsequent blocking of the IGBTs 21, to open the first and second mechanical disconnector switches 9, 10, as soon as the current through the circuit breaker 1 is small enough, therefore as soon as the current falls below a prespecifiable limit, for AC current in particular in the region of the zero-crossing. Thereby, the heating caused by the leakage current of the varistor can be held at a low level, even for strongly reactive loads.

It is provided that the semiconductor circuit arrangement 11 includes two discrete semiconductor components or power semiconductor components. It is in particular provided that the semiconductor circuit arrangement 11 includes only or exactly two discrete semiconductor components or power semiconductor components. This is to be understood such that, depending on the power requirements, two or more discrete semiconductor components or power semiconductor components may be connected in parallel.

According to the preferred embodiments of FIGS. 2 and 3, it is provided that the two discrete semiconductor components are each configured in the form of reverse conduction IGBTs 25. Reverse conduction IGBTs 25 include an integrated reverse diode.

The two discrete semiconductor components are arranged in antiseries with each other and in parallel with the bypass switch 8. According to FIG. 2, the two discrete semiconductor components configured in the form of reverse conduction IGBTs 25 are arranged in antiseries in a common emitter circuit. According to FIG. 3, the two discrete semiconductor components configured in the form of reverse conduction IGBTs 25 are arranged in antiseries in a common collector circuit.

According to the preferred embodiment of FIG. 4, it is provided that the two discrete semiconductor components are each configured in the form of reverse blocking IGBTs 26. Reverse blocking IGBTs 26 are capable of withstanding high reverse currents. Furthermore, they are capable of blocking currents in both directions, when the component is turned off.

According to FIG. 4, the two discrete semiconductor components configured in the form of reverse blocking IGBTs 26 are arranged in antiparallel with each other and in parallel with the bypass switch 8.

According to a preferred improvement of the present invention, it is provided that the electronic control unit 13 is designed, when turning the circuit breaker 1 on, first to operate the second mechanical disconnector switch 10 to close, then to operate the first mechanical disconnector switch 9 to close, and in a prespecifiable first time thereafter, to turn the semiconductor circuit arrangement 11 on.

Thereby, a circuit breaker 1 can be obtained, which has a small size and a long lifetime and which can be manufactured at low cost.

Thereby, the amplitude of the voltage peak, which acts on the voltage-dependent resistor 19, is clearly reduced. Thereby, a voltage-dependent resistor 19 or a varistor with lower rated voltage can be used. Such a component has, compared to a higher voltage-resistant varistor, a lower leakage current, which in operation will lead to a lower heating of the circuit breaker 1, whereby the lifetime of this component and of the other semiconductors in its environment can be extended.

Thereby, further, for the power semiconductor switches, those with lower collector-emitter cutoff voltages can be used. Furthermore, thereby, diodes with lower periodic peak cutoff voltages can be used. Such components have, compared to higher loadable components, a clearly smaller size, and are further less costly. Thereby, the cost as well as the size of a circuit breaker 1 can be reduced, with the intrinsic heating being reduced simultaneously, and consequently the lifetime is increased. Alternatively, with an unchanged size, the electric load capacity of a circuit breaker 1 can be considerably increased.

Power semiconductors with lower collector-emitter cutoff voltages or periodic peak cutoff voltages further have a lower internal resistance, whereby in the case of turning a short-circuit current off, the time for converting the building-up short-circuit current from the bypass branch to the first semiconductor circuit arrangement 11 can be reduced. Thereby, the load of the bypass switch 8 as well as of the first semiconductor circuit arrangement 11 can further be reduced.

By the reduction of the size, thus of the physical area, of the power semiconductors, the loop inductance of the first semiconductor circuit arrangement 11 can clearly be reduced. This is, beside the resistance, another main significant factor of the time for converting the building-up short-circuit current from the bypass branch to the first semiconductor circuit arrangement 11, which is further lowered by the reduction of the physical area of the power semiconductors.

Furthermore, thereby, the height of transient voltage peaks, which are transferred into the power mains by the internal switching operations of the circuit breaker 1, is lowered.

Furthermore, thereby, a snubber 24 in the region of the semiconductor circuit arrangement 11 can be significantly made smaller or be fully dispensed with.

For turning the circuit breaker 1 on, it is provided that the electronic control unit 13, which is correspondingly configured, first operates the second mechanical disconnector switch 10 and then the first mechanical disconnector switch 9 such that the switching contacts thereof are closed. Preferably, the first and second mechanical disconnector switches 9, 10 are each configured in the form of a part of a bistable relay. A prespecifiable first time thereafter, the control unit 13 will turn the semiconductor circuit arrangement 11 on.

The first time preferably is so long that the switching contacts of the first mechanical disconnector switch 9 and the switching contacts of the second mechanical disconnector switch 10 have reached a mechanically steady state. Therefore, they are safely connected without bouncing.

When practically executing the present invention, it was found out that the first time should be between 0.8 ms and 1.2 ms, in particular substantially 1 ms. However, these values can vary, depending on the type of the turn-on mechanism of the first and second mechanical disconnector switches 9, 10.

The present circuit breaker 1 is provided or configured for operation in DC voltage power mains or in AC voltage power mains.

When the circuit breaker 1 is designed in the form of an AC voltage switching device, it is provided that it further includes a voltage-measuring device 29, which is connected to the control unit 13, and that the electronic control unit 13 is designed to operate the first mechanical disconnector switch 9 and the second mechanical disconnector switch 10 in a prespecifiable second time before a first zero-crossing of an applied mains voltage. The voltage-measuring device 29 is shown in FIG. 1 only together with the current measuring arrangement 12.

Electric power mains with an AC voltage are normally very stable with respect to the mains frequency thereof, with variations between immediately successive zero-crossings being extremely low. Preferably, it is provided that before the actual turn-on operation, an actual period length of the respective power mains is determined, based on a prespecifiable number of zero-crossings. Thereby, such a circuit breaker 1 is equally suitable without any further adjustments in power mains with different mains frequencies. After several zero-crossings, in particular eight to twelve, a sufficiently accurate value of the period length can be determined. As soon as this is achieved, then after a so-called zeroth zero-crossing up to the transmission of the turn-on signal for the first and second mechanical disconnector switches 9, 10 by the electronic control unit 13, it is waited for the determined period length minus the second time. In this way, the two disconnector switches 9, 10 can be turned on at the specified time before the first zero-crossing.

Preferably, it is provided that the second time is substantially half as long as the first time. Then, these times are arranged symmetrically about the first zero-crossing.

Preferably, it is further provided that the electronic control unit 13 is designed to turn the bypass switch 8 on at the second zero-crossing of the mains voltage immediately following the first zero-crossing.

Figure 5:
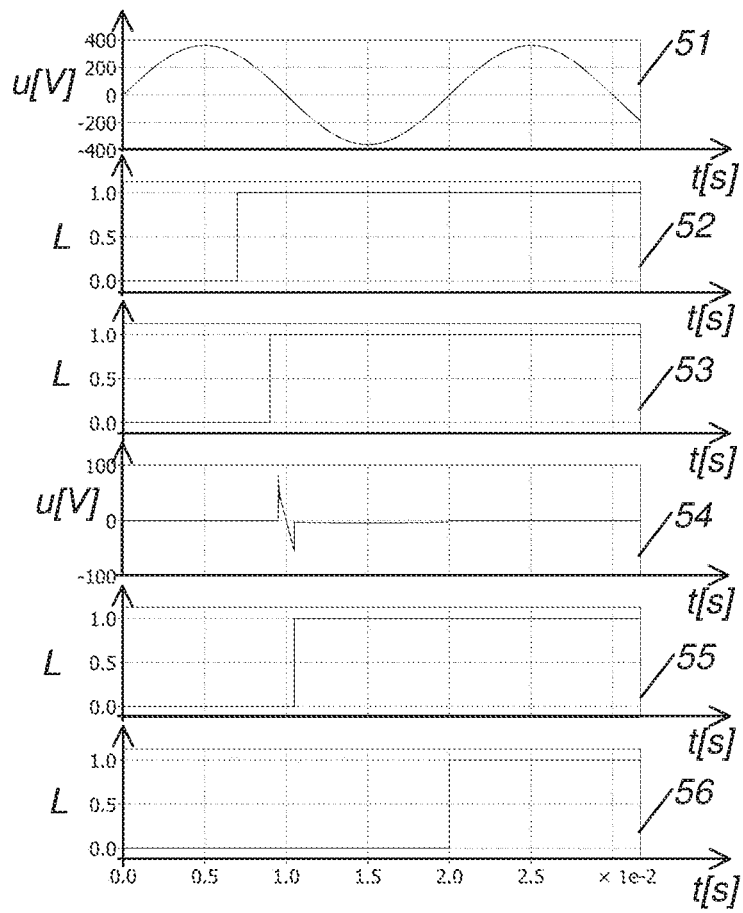
FIG. 5 a time-related switching sequence of a preferred embodiment of a circuit breaker of FIG. 1.

FIG. 5 shows a corresponding turn-on operation in six diagrams 51, 52, 53, 54, 55, 56. The first diagram 51 shows the course of the mains voltage, which may also be referred to as source voltage. The second diagram 52 shows the logic on/off signal of the second mechanical disconnector switch 10, wherein the logic value 1 designated L, same as in diagrams 53, 55, and 56, represents "ON," and the logic value 0 represents "OFF." The third diagram 53 shows the logic on/off signal of the first mechanical disconnector switch 9. The fourth diagram 54 shows the course of the voltage at the voltage-dependent resistor 19. The fifth diagram 55 shows the logic on/off signal of the power semiconductors 25, 26. The sixth diagram 56 shows the logic on/off signal of the bypass switch 8.

By the mentioned measures, the semiconductor circuit arrangement 11 may also be designed without a snubber member, whereby further components can be dispensed with, and whereby it can be avoided, during the turn-on operation, that a capacitor has to be charged. Thereby, the semiconductor circuit arrangement 11 draws less current during the turn-on operation. A corresponding snubber member, referred to as snubber 24, is illustrated in FIG. 1.

According to a preferred improvement, it is provided that the voltage-dependent resistor 19 is configured in the form of a thermofuse varistor, whereby the reliability can further be increased.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A circuit breaker, comprising:
    at least one external conductor section from an external conductor supply terminal of the circuit breaker to an external conductor load terminal of the circuit breaker; and
    one neutral conductor section from a neutral conductor terminal of the circuit breaker to a neutral conductor load terminal of the circuit breaker,
    wherein a mechanical bypass switch is arranged in the at least one external conductor section,
    wherein a semiconductor circuit arrangement of the circuit breaker, which semiconductor circuit arrangement comprises a four-quadrant switch, is connected in parallel with the mechanical bypass switch,
    wherein a current measuring arrangement is arranged in the at least one external conductor section and is connected to an electronic control unit of the circuit breaker,
    wherein the electronic control unit is configured to operate the mechanical bypass switch and the semiconductor circuit arrangement in a prespecifiable manner,
    wherein a voltage-dependent resistor is arranged in parallel with the mechanical bypass switch,
    wherein the semiconductor circuit arrangement has two discrete semiconductor components
    wherein a first mechanical disconnector switch is arranged in the at least one external conductor section,
    wherein a second mechanical disconnector switch is arranged in the neutral conductor section,
    wherein that the electronic control unit is configured to operate the first mechanical disconnector switch,
    wherein the electronic control unit is configured to operate the second mechanical disconnector switch,
    wherein the electronic control unit is configured, when turning the circuit breaker on, to operate first the second mechanical disconnector switch to close, then to operate the first mechanical disconnector switch to close, and in a prespecifiable first time thereafter, to turn the semiconductor circuit arrangement on,
    wherein the circuit breaker comprises an AC voltage switching device, the circuit breaker further comprising a voltage-measuring device, which is connected to the electronic control unit,
    wherein the electronic control unit is configured to operate the first mechanical disconnector switch and to operate the second mechanical disconnector switch in a prespecifiable second time before a first zero-crossing of an applied mains voltage, and
    wherein the second time is substantially half as long as the first time.

2. The circuit breaker of claim 1, wherein the two discrete semiconductor components each comprise reverse conduction IGBTs.

3. The circuit breaker of claim 2, wherein the two discrete semiconductor components are arranged in antiseries with each other and in parallel with the mechanical bypass switch.

4. The circuit breaker of claim 1, wherein the two discrete semiconductor components each comprise reverse blocking IGBTs.

5. The circuit breaker of claim 4, wherein the two discrete semiconductor components are arranged in antiparallel with each other and in parallel with the bypass switch.

6. The circuit breaker of claim 1, wherein the first time is so long that switching contacts of the first mechanical disconnector switch and switching contacts of the second mechanical disconnector switch reach a mechanically steady state.

7. The circuit breaker of claim 1, wherein the first time is between 0.8 ms and 1.2 ms.

8. The circuit breaker of claim 7, wherein the first time is substantially 1 ms.

9. The circuit breaker of claim 1, wherein the electronic control unit is configured, at a second zero-crossing of the mains voltage immediately following the first zero-crossing, to turn the mechanical bypass switch on.

10. The circuit breaker of claim 1, wherein the semiconductor circuit arrangement is configured without a snubber member.

11. The circuit breaker of claim 1, wherein the voltage-dependent resistor comprises a varistor.

12. The circuit breaker of claim 11, wherein the varistor comprises a thermally coupled fuse.

13. The circuit breaker of claim 1, wherein the semiconductor circuit arrangement has only two discrete semiconductor components.

14. The circuit breaker of claim 1, wherein the first mechanical disconnector switch is arranged in the at least one external conductor section in series with the mechanical bypass switch.

* * * * *